A. P. WYLIE.
SWING SAW.
APPLICATION FILED NOV. 8, 1909.
969,505.
Patented Sept. 6, 1910.
2 SHEETS—SHEET 1.
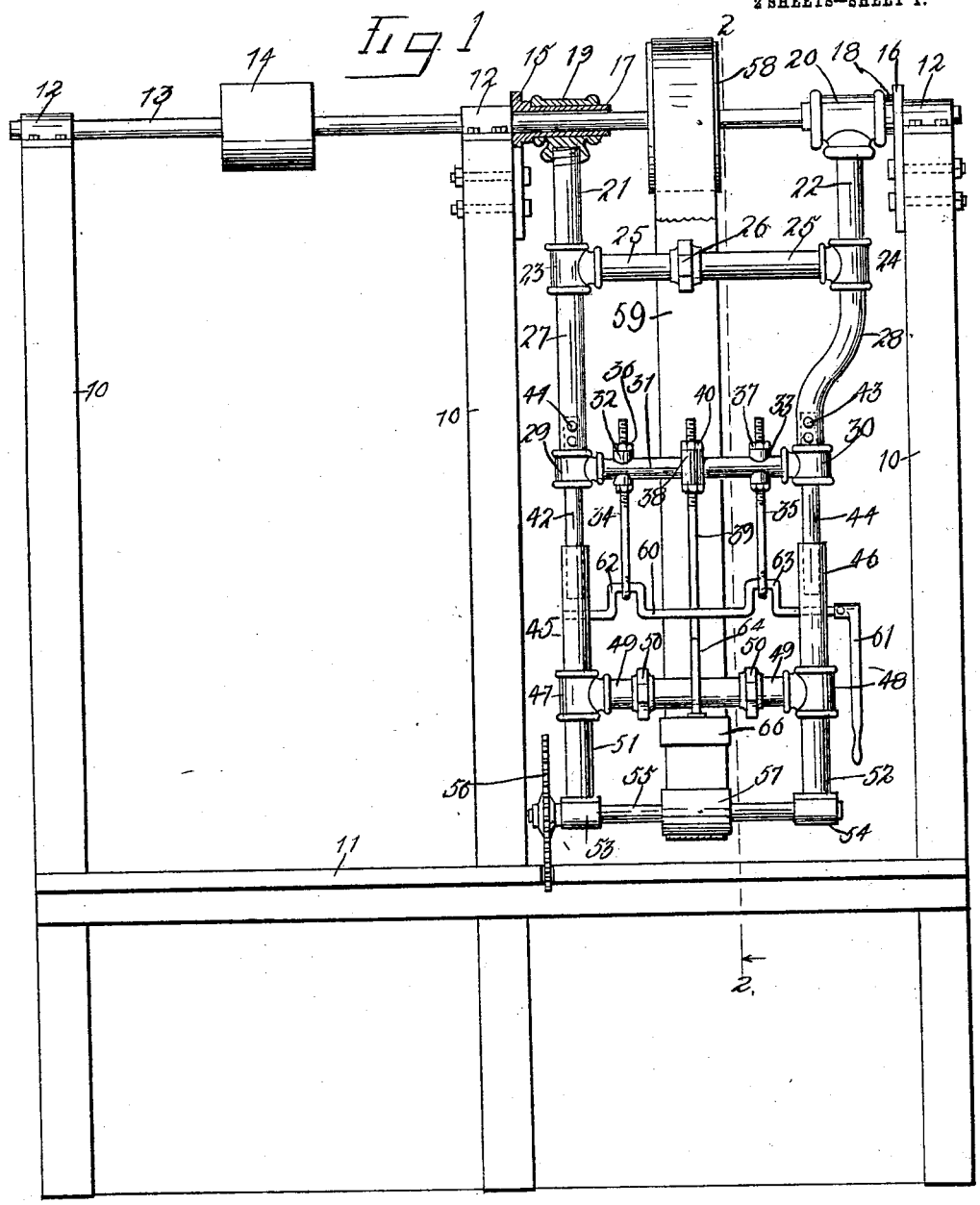
Witnesses
Inventor
ABRAHAM P WYLIE.
By
Attorney

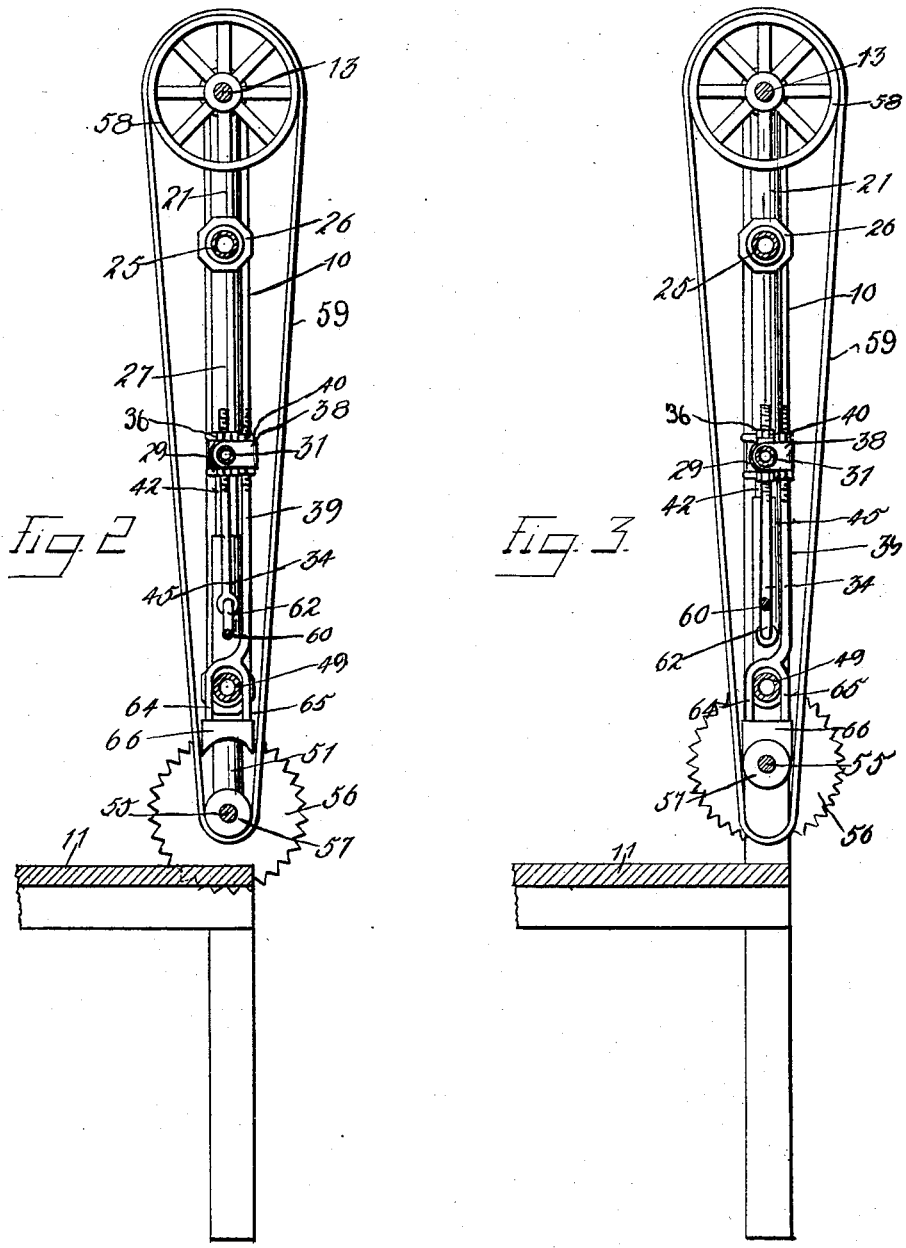

UNITED STATES PATENT OFFICE.

ABRAHAM P. WYLIE, OF LAWRENCEBURG, TENNESSEE.

SWING-SAW.

969,505.  Specification of Letters Patent.  Patented Sept. 6, 1910.

Application filed November 8, 1909. Serial No. 526,832.

*To all whom it may concern:*

Be it known that I, ABRAHAM P. WYLIE, a citizen of the United States, residing at Lawrenceburg, in the county of Lawrence, State of Tennessee, have invented certain new and useful Improvements in Swing-Saws; and I do hereby declare the following to be a full, clear, and exact description of the invention, such as will enable others skilled in the art to which it appertains to make and use the same.

This invention relates to sawing machines, more particularly to the class of swinging saws, wherein a frame is suspended swingingly above the saw table and carrying a saw mandrel supplied with a rotary saw, and has for one of its objects to provide a simply constructed device whereby the saw mandrel may be adjusted to dispose a saw in any required position relative to the table, and also provided with means for instantly elevating the saw free from the table and the work thereon.

Another object of the invention is to provide a simply constructed device whereby the saw may be instantly elevated from the work on the table and a brake applied to stop the motion of the saw at the same time that it is elevated.

With these and other objects in view, the invention consists in certain novel features of construction as hereinafter shown and described and then specifically pointed out in the claims; and, in the drawings illustrative of the preferred embodiment of the invention, Figure 1 is a front elevation, partly in section, of the improved device, Fig. 2 is a side elevation of the improved device in section on the line 2—2 of Fig. 1, Fig. 3 is a view similar to Fig. 2, showing the saw mandrel and its supporting frame elevated and the brake applied.

The improved device comprises a supporting frame formed of vertical standards 10 and supporting a horizontal saw table 11 of the usual form.

Mounted for rotation by bearings 12 upon the standards 10 is a main drive shaft 13 having a drive pulley 14 to which the drive belt will be applied, the latter not being shown as it forms no part of the present invention.

Connected to the confronting faces of two of the standards 10 are brackets 15—16, the bracket 15 carrying a tubular sleeve or bearing 17, while the bracket 16, is provided with a similar bearing indicated at 18. The shaft 13 extends through the tubular members 17—18, but does not necessarily engage therewith. Preferably the apertures in the bearings 17—18 will be larger than the shaft so that the shaft does not engage or bear upon the tubular members, as shown in Fig. 1.

Mounted to swing upon the tubular bearings 17—18 is an open frame formed of sections of gas piping, and this frame comprises T-couplings 19—20 mounted for rotation upon the members 17—18 and to which sections of piping 21—22 are connected, as shown. At their lower ends the pipe sections 21—22 are provided with T-couplings 23—24, the latter being united by a transverse member formed of pipe sections 25 and a union 26. Connected to the T-couplings 23—24 are other pipe sections 27—28, and connected to the lower end of the sections 27—28 are T-couplings 29—30. The couplings 29—30 are united by a transverse tubular member 31, which is arranged to oscillate in the members 29—30. The member 31 is provided with transverse bearings 32—33 near its ends through which rods 34—35 are adjustably supported by adjusting nuts 36—37. The member 31 is also provided with a central bearing 38 through which a rod 39 extends and is adjustably coupled to the member 38 by nuts 40, the object of the various rods to be hereinafter explained.

Rigidly secured in the member 27 by rivets or other fastening means 41 is a guide rod 42, and similarly secured in the member 28 by rivets or other fastening devices 43 is a guide rod 44, the guide rods depending below the lower ends of the members 29—30, as shown. Slidably arranged upon the rod 42 is a tubular member 45, while a similar tubular member 46 is slidably disposed upon the rod 44, the members 45—46 corresponding to the side members 27—28. At their lower ends the members 45—46 are provided with T-couplings 47—48, and the T-couplings are united by a transverse member formed of sections of piping 49 and unions 50. Connected to the lower ends of the T-couplings 47—48 are pipe sections 51—52. At its lower end the pipe section 51 is provided with a bearing 53, while the pipe section 52 is provided with a similar bearing 54, these latter bearings forming supports for a saw mandrel 55 carrying a saw 56 at one end and with a drive pulley 57 centrally thereof and in vertical alinement with a larger drive pulley 58 upon the shaft 13, as shown. A drive belt 59 operates over the pulleys 57—58 as shown, and by means of which the saw mandrel is operated when the lower frame portion is in its lower position. Mounted for rotation through the frame members 45—46 is a shorter shaft 60 having a handle 61 at one end and with cranks 62—63 intermediate its ends and between the members 45—46. The rods 34—35 are coupled to the cranks 62—63, as shown. By this means it will be obvious that when the shaft 60 is arranged with its cranks directed upwardly the lower frame portion, which carries the saw mandrel, is maintained in its lower position with the saw in operative position relative to the table 11, as shown in Figs. 1 and 2, and so long as the saw is operating under normal conditions the shaft 60 will be retained in the position shown with the saw supporting portion of the frame in its downward position.

In saws of this character it frequently occurs that it is desirable to quickly elevate the saw free from the work with which it is engaged, and when such an emergency occurs the operator can instantly elevate the saw by grasping the handle 61 and moving it upwardly, and thereby reversing the positions of the cranks 62—63 or quickly disposing them in their downward position and correspondingly elevating the lower saw carrying portion of the frame and removing the saw quickly from contact with the work on the table.

The nuts 36—37 provide for the adjustment of the rods 34—35 and consequently for the adjustment of the lower saw carrying frame portion, so that the saw 56 may be supported at any desired point relative to the table within the range of the threads on the rods.

The rod 39 is directed downwardly and is forked at its lower end as shown at 64—65 and extends upon either side of the central pipe section 49, and connected to the lower ends of the forked portions is a brake block 66 with which the drive pulley 57 engages when the saw carrying portion or frame is elevated, to instantly stop the rotary motion of the saw when the latter is elevated free from the belt 59, as represented in Fig. 3.

By this simple means the saw is not only quickly elevated free from the work upon the table but its rotary motion is instantly stopped, and all danger from the continued motion of the saw caused by its momentum, is obviated.

What is claimed is:—

1. A device of the class described comprising a supporting structure including a saw table, tubular bearings carried by said supporting structure, a shaft extending through said tubular bearings, an upper frame mounted to swing upon said tubular bearings and including a transverse member having spaced bearings, a lower frame vertically movable relative to said upper frame, a saw mandrel carried by said lower frame, means for communicating the motion of said shaft to the saw mandrel, a shaft mounted for rotation in said lower frame and provided with spaced cranks, suspension rods coupled to said cranks and extending through the bearings of the transverse member of the upper frame, and means for rotating said cranked shaft.

2. A device of the class described comprising a supporting structure including a saw table, an upper frame mounted to swing upon said supporting structure and including a transverse member having spaced bearings, a lower frame vertically movable upon said upper frame, a saw mandrel carried by said lower frame, means for communicating motion to said saw mandrel, a shaft mounted for rotation in said lower member and provided with spaced cranks, threaded rods coupled to said cranks and extending through the bearings of the transverse member of the upper frame, adjusting nuts upon said rods, and means for rotating said cranked shaft.

3. A device of the class described comprising a supporting structure including a saw table, an upper frame mounted to swing from said supporting structure, a lower frame vertically movable upon said upper frame, a saw mandrel carried by said lower frame, means for communicating motion to said saw mandrel, means for adjusting said lower frame upon said upper frame, means for instantly moving said lower frame longitudinally of said upper frame, and a brake device located in the path of said saw mandrel when said lower frame is longitudinally moved or adjusted.

4. A device of the class described comprising a supporting structure including a saw table, an upper frame mounted to swing upon said supporting structure and including a transverse member having spaced bearings, a lower frame vertically movable upon said upper frame, a saw mandrel carried by said lower frame, means for communicating motion to said saw mandrel, a shaft mounted for rotation in said lower frame and provided with spaced cranks, threaded rods coupled to said cranks and extending through the bearings of the transverse member of the upper frame, adjusting nuts upon said rods, means for rotating said cranked shaft, and a rod carried by said transverse member and provided with a brake member extending into the path of said saw mandrel when said lower frame is longitudinally moved or adjusted.

5. A device of the class described comprising a supporting structure including a saw table and a drive shaft and a driving pulley, an upper frame mounted to swing from said supporting structure, a lower frame vertically movable upon said upper frame, a saw mandrel carried by said lower frame and carrying a driven pulley, a drive belt leading over said pulleys, means for adjusting said lower frame upon said upper frame, means for instantly moving said lower frame longitudinally of said upper frame, and a brake device carried by said upper frame and extending into the path of said driven pulley when said frame is longitudinally moved or adjusted.

6. A device of the class described comprising a supporting structure provided with a saw table, an upper frame mounted to swing upon said supporting structure, a transverse member carried by said upper frame and mounted for rotation therein, rods depending from said transverse member, a lower frame vertically movable upon said upper frame, a saw mandrel carried by said lower frame, means for communicating motion to said mandrel, a crank shaft mounted for rotation in said lower frame and coupled by its cranks to said rods, and means for actuating said cranked shaft.

7. A device of the class described comprising a supporting structure provided with a saw table, an upper frame mounted to swing upon said supporting structure, a transverse member carried by said upper frame and mounted for oscillation therein, rods depending from said transverse member, a lower frame vertically movable upon said upper frame, a saw mandrel carried by said lower frame, means for communicating motion to said saw mandrel, a cranked shaft mounted for rotation in said lower frame and coupled by its cranks to said rods, another rod connected to said oscillating member and having a brake device at its free end, and extending into the path of the mandrel, and means for actuating said cranked shaft.

8. A device of the class described comprising a supporting structure provided with a saw table, an upper frame mounted to swing upon said supporting structure, a transverse member carried by said upper frame and mounted for oscillation therein, rods depending from said transverse member, a lower frame vertically movable upon said upper frame and comprising a transverse member, a saw mandrel carried by said lower frame, means for communicating motion to said saw mandrel, a crank shaft mounted for rotation in said lower frame and coupled by its cranks to said rods, another rod connected to said oscillating member and forked at its free end and bearing upon opposite sides of the transverse member of the lower frame, a brake device carried by said forked rod portions and extending into the path of the mandrel, and means for rotating said cranked shaft.

9. A device of the class described comprising a supporting structure provided with a saw table, an upper frame mounted to swing upon said supporting structure, a transverse member carried by said upper frame and mounted for oscillation therein, a lower frame vertically movable relative to said upper frame and including a transverse connecting member, a saw mandrel carried by said lower frame, a rod carried by said oscillating member and forked at its free end and bearing upon opposite sides of the transverse member of the lower frame, and a brake device carried by the forked portions of said rod and extending into the path of said mandrel, and means for actuating said movable lower frame.

In testimony whereof, I affix my signature, in presence of two witnesses.

ABRAHAM P. WYLIE.

Witnesses:
M. B. TODD,
E. L. WYLIE.